United States Patent [19]

Danzik

[11] 4,215,211

[45] Jul. 29, 1980

[54] POLYMERIZATION OF 2-PYRROLIDONE WITH $CO_2/SO_2$

[75] Inventor: Mitchell Danzik, Pinole, Calif.

[73] Assignee: Chevron Research Company, San Francisco, Calif.

[21] Appl. No.: 871,272

[22] Filed: Jan. 23, 1978

Related U.S. Application Data

[63] Continuation of Ser. No. 749,854, Dec. 13, 1976, abandoned, which is a continuation of Ser. No. 575,917, May 9, 1975, abandoned.

[51] Int. Cl.$^2$ ............................................. C08G 69/24
[52] U.S. Cl. ................................... 528/313; 528/312; 528/319; 528/326
[58] Field of Search ........................... 260/78 P, 78 L; 528/313, 312, 326

[56] References Cited

U.S. PATENT DOCUMENTS

| | | | |
|---|---|---|---|
| 3,174,951 | 3/1965 | Taber | 260/78 P |
| 3,721,652 | 3/1973 | Barnes | 260/78 P |
| 4,100,146 | 7/1978 | Bacskai | 528/313 |
| 4,101,531 | 7/1978 | Bacskai | 528/313 |
| 4,105,645 | 8/1978 | Barnes et al. | 528/313 |
| 4,107,154 | 8/1978 | Bacskai | 528/318 |

*Primary Examiner*—Harold D. Anderson
*Attorney, Agent, or Firm*—D. A. Newell; T. G. DeJonghe; L. S. Squires

[57] ABSTRACT

An improved process for the polymerization of 2-pyrrolidone provides high-molecular-weight poly-2-pyrrolidone at higher rates of conversion by effecting the alkaline-catalyzed polymerization in the presence of a synergistic activator consisting of carbon dioxide and sulfur dioxide.

2 Claims, No Drawings

POLYMERIZATION OF 2-PYRROLIDONE WITH $CO_2/SO_2$

CROSS REFERENCE TO RELATED APPLICATIONS

This application is a continuation of application Ser. No. 749,854, filed Dec. 13, 1976, and now abandoned which, in turn, is a continuation of application Ser. No. 575,917, filed May 9, 1975, and now abandoned.

BACKGROUND OF THE INVENTION

Poly-2-pyrrolidone, which is also known as nylon-4, is believed to be a linear polymer characterized by the repeating structural unit

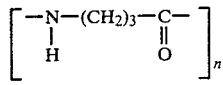

The polymer is capable of being formed into filaments having substantial orientation along the filamentary axis, high tensile strength, and other properties suitable for making into textiles. The polymer is also suitable for making into films, sheets, shaped and molded articles. Poly-2-pyrrolidone is formed by the alkaline catalyzed polymerization of 2-pyrrolidone.

The present invention relates to an improved process for the polymerization of 2-pyrrolidone. Methods for the alkaline-catalyzed polymerization of 2-pyrrolidone have been previously described, for example, in U.S. Pat. Nos. 3,721,652, 3,174,951, 3,681,296, 3,681,295 and 2,638,463. In general, these methods effect polymerization in the presence of a polymerization activator (initiator) as well as the alkaline catalyst. Sulfur dioxide has been found to function as a polymerization activator for the polymerization of 2-pyrrolidone, see U.S. Pat. No. 3,174,951, but the $SO_2$-initiated polymer product has a distinct yellow color which is highly undesirable, see U.S. Pat. No. 3,681,295. Carbon dioxide also functions as a polymerization activator for the alkaline catalyzed polymerizaton of 2-pyrrolidone, see U.S. Pat. No. 3,721,652.

SUMMARY OF THE INVENTION

The alkaline-catalyzed polymerization of 2-pyrrolidone is effected in the simultaneous presence of both carbon dioxide and sulfur dioxide. These compounds unexpectedly function in combination to increase the rate of conversion of monomer to polymer over that obtainable from either alone in equivalent amount.

DETAILED DESCRIPTION OF PREFERRED EMBODIMENTS

The source of alkaline polymerization catalyst for the polymerization of 2-pyrrolidone is selected from any of those described in the prior art. The alkali metals, the alkali metal hydroxides and alkoxides, or the alkaline earth metals and alkaline earth metal hydroxides, or strongly basic organometallic compounds, or organic bases such as quaternary ammonium hydroxide (see U.S. Pat. No. 2,973,343) have been used to make the alkaline polymerization catalyst by contacting them with a lactam, preferably 2-pyrrolidone. The alkali metals are generally effective either as the uncombined metal or in the form of hydrides, borohydrides, oxides, hydroxides, carbonates, amides, alkoxides, etc. The organometallics include lithium and potassium alkyls and aryls. Mixtures of these compounds may also be employed. The catalyst is made by contacting the basic compound, such as a source of alkali metal or a quaternary ammonium compound with a 5-7 membered-ring lactam.

The preferred catalyst is made by contacting a source of alkali metal, preferably potassium hydroxide, with 2-pyrrolidone. The preferred catalyst is potassium pyrrolidonate. It can be made in situ by the addition of potassium hydroxide to more than an equivalent amount of 2-pyrrolidone, but there are numerous other ways of making it, as by the addition of the potassium compounds enumerated above, potassium metal, or mixtures thereof, to 2-pyrrolidone. If potassium hydroxide is used to prepare the catalyst, it can be added either in solid form or as an aqueous KOH solution. In either case, after the addition of KOH to 2-pyrrolidone, water is removed to give a substantially anhydrous solution of potassium pyrrolidonate in 2-pyrrolidone. Solid KOH pellets (85% KOH, 15% water) have been employed, as have aqueous KOH solutions having a potassium hydroxide content of 10-65 percent by weight. As noted elsewhere, see U.S. Pat. No. 3,778,402, the polymerization yield may be depressed if the period between potassium hydroxide addition to the pyrrolidone and the removal of water is a very extended period. Consequently, in the production of the alkaline catalyst, water is normally removed promptly by distillation under reduced pressure and distillation is normally continued until incipient 2-pyrrolidone distillation.

The total alkaline polymerization catalyst comprises from about 0.5 to about 50 mol percent, or higher, of the monomer-catalyst mixture, based on total monomer. Preferably about 5-20 mol percent, and most preferably about 10 mol percent total catalyst is used, based on total monomer. Total alkaline polymerization catalyst is defined as the alkaline catalyst including any portion thereof having formed an adduct with activators such as $SO_2$ and $CO_2$. Total monomer, or total 2-pyrrolidone, consists of pyrrolidonate catalyst, 2-pyrrolidone provided as solvent for said catalyst, 2-pyrrolidonate catalyst having formed an adduct with the activator and any additional monomer charged to the reactor.

The improved polymerization of 2-pyrrolidone is carried out in the presence of a polymerization activator which comprises both carbon dioxide and sulfur dioxide. The presence of both sulfur dioxide and carbon dioxide is found to exert a synergistic effect on the polymerization. By "synergistic effect" is meant the observation that the combined polymerization activator, $SO_2/CO_2$, is found to be superior to either one alone in its ability to increase the rate of polymerization under normal conditions. This synergism is coupled with the production of a high-molecular-weight poly-2-pyrrolidone of improved color, i.e., greater whiteness, over that obtained from $SO_2$ alone under the same conditions with the same yield.

The polymerization activator, $SO_2/CO_2$, is normally used in amounts sufficient to effect substantial conversion and reasonable yields of high-viscosity polymer in a reasonable period of time. Up to 0.3 or more combined mols of activator per mol of 2-pyrrolidone can be used, normally about 0.02-30 combined mol percent of activator, based on total monomer, but 0.02-10 mol percent is preferred, and about 1-5 combined mol percent is most preferred. Combined mol percent, or combined mols, of activator means the sum of the $SO_2$ and $CO_2$ quantities. The combined activator is composed of carbon dioxide and sulfur dioxide in a mol ratio of about 1:0.002–500 or preferably 1:0.01–100, more preferably 1:0.1–10, and most preferably 1:0.3–0.5, $CO_2$:$SO_2$.

The amount of activator can be expressed as mol percent based on total alkaline polymerization catalyst. Total alkaline polymerization catalyst is the alkaline catalyst including any portion of the catalyst which forms an adduct with activators such as $SO_2$ and $CO_2$. On this basis, the activator is present as from about 5 to about 60 combined mol percent, and preferably about 10–40 combined mol percent $SO_2$/$CO_2$ based on total alkaline polymerization catalyst. Other activators (initiators), such as the acyl-types which are known to the prior art as polymerization activators for 2-pyrrolidone, may also be present in small amounts of 0.02–0.1 mol percent, based on monomer, as coactivators: U.S. Pat. Nos. 2,739,959, 2,809,958, 3,681,295, 3,681,296, etc. Group VI oxides other than $SO_2$ also function in combination with $CO_2$ to form a polymerization activator system. Such Group VI oxides include $SeO_2$, $TeO_2$, $MoO_2$, etc.

In the preferred practice of making 2-pyrrolidone, the alkaline polymerization catalyst is prepared in situ with the monomer to be polymerized, as by the addition of less than an equivalent stoichiometric amount of a source of alkali metal to 2-pyrrolidone to form a solution of alkali metal pyrrolidonate in 2-pyrrolidone. Then carbon dioxide and sulfur dioxide are bubbled into the mixture in any order, or simultaneously, in the amount needed to provide the above-stated concentrations. Of course, a source of sulfur dioxide and/or carbon dioxide other than the uncombined gases may be used to effect the required presence of the initiator. For example, the source may be a compound capable of transferring $CO_2$ or $SO_2$ to the mixture of catalyst and monomer such that the remainder of the compound is not deleterious to polymerization.

As an example of the in situ production of catalyst and the addition of activator, consider the hypothetical situation of 100 mols of 2-pyrrolidone to which 10 mols of KOH are added to form 10 mols of potassium pyrrolidonate, leaving 90 mols of unreacted 2-pyrrolidone. The solution is thus 10 mol percent catalyst based on total monomer. If 2 mols of $CO_2$ and 1 mol of $SO_2$ are then added to form 2 mols of $CO_2$-catalyst adduct and 1 mol of $SO_2$-catalyst adduct, there are 3 combined mols of activator per 10 mols of total catalyst and 7 mols of catalyst remain unreacted. The solution then contains 3 combined mol percent activator based on total monomer, or 30 combined mol percent activator based on total catalyst. The solution is still 10 mol percent total catalyst based on total monomer. The mol ratio $CO_2$:$SO_2$ is 1:0.5.

As an alternative to the in situ method, it is also practicable to separate adducts of $CO_2$ or $SO_2$ with the lactam salt alkaline catalyst, e.g., an adduct of potassium pyrrolidonate and $CO_2$. The adducts can be handled separately and combined as needed with the monomer before or after the addition of additional catalyst to form a complete catalyst system, including activator. Such lactam salts comprise $C_4$ and $C_6$ lactam salts of alkali metal and quaternary ammonium compounds, i.e., 2-pyrrolidone and caprolactam salts.

The preparation of poly-2-pyrrolidone, according to the novel process of this invention, can be carried out with various amounts of monomers, catalysts, diluents, activators, and other additives—the amount of each being properly coordinated to produce the most effective polymerization. Although the preferred amounts of the components in the reaction mixture and preferred reaction conditions are given, it is to be understood that these are not intended to be limits to the polymerization since it may be possible to effect substantial polymerization outside the preferred ranges.

In general, 2-pyrrolidone may be polymerized at a temperature of from about 18° C. to about 100° C., preferably from about 25° C. to about 70° C. and most preferably from about 40° C. to about 60° C., under a pressure ranging from subatmospheric to superatmospheric, in the presence of the above-described catalyst and activator for a period of from 4 to about 100 hours, preferably from 8 to about 72 hours, and most preferably from about 8 to about 48 hours. In continuous operation, polymerization times refer to average residence times under polymerizaton conditions.

Polymerizaton may be effected in the bulk, by solution polymerization, by dispersion polymerization or by any other process compatible with the production of a high-molecular-weight poly-2-pyrrolidone. Product whiteness, polymer viscosity and melt spinnability (see U.S. Pat. No. 3,721,652) are important considerations in the choice of preferred process parameters. Basically, the present process for polymerizing 2-pyrrolidone can be carried out by any substantially anhydrous alkaline-catalyzed polymerization technique using the synergistic activator of the present invention, which yields a substantially particulate or granular solid poly-2-pyrrolidone, or a solid poly-2-pyrrolidone capable of being comminuted, whether that technique is characterized as dispersion polymerization, suspension polymerization, bulk polymerization, precipitation polymerization, solution polymerization, or another. The polymerization may be accomplished either in batch, semi-continuously or continuously, the latter being preferred.

In order to produce high-quality poly-2-pyrrolidone capable of being formed into fibers, filaments and yarn of commercial textile quality, it is necessary that the 2-pyrrolidone monomer be of high purity. Depending upon the process of manufacture, commercially available 2-pyrrolidone may contain appreciable amounts of various impurities, some of which apparently interfere deleteriously with polymerization. Purification of the monomer to polymerization grade is achieved by crystallization; distillation; distillation from a boron oxide, as disclosed in U.S. Pat. No. 3,806,427; aqueous caustic hydrolysis and distillation, as disclosed in U.S. Pat. No. 3,721,652; acid treatment and distillation, as disclosed in U.S. Pat. No. 3,721,652; and these and other purification techniques in combination.

The process of the present invention is just as applicable to the production of copolymers of 2-pyrrolidone, such as with caprolactam, and to polymers of C-substituted 2-pyrrolidone as to the production of poly-2-pyrrolidone. Consequently, in general, and unless otherwise indicated, monomer denotes 2-pyrrolidone and any compound capable of copolymerizing with 2-pyrrolidone under these conditions of alkaline polymerization catalysis.

EXAMPLE 1

200 g (2.35 mol) of purified 2-pyrrolidone was placed in a flask equipped for vacuum distillation and fitted with a gas inlet tube. 15.4 g (0.235 mol, 10 mol percent based on monomer) of 85.7% pure potassium hydroxide was added, and the system was swepted with dry nitrogen. The mixture was placed under reduced pressure and heated to incipient distillation of pyrrolidone, during which time the water of reaction was removed. The solution was then cooled to 30° C. and 3.1 g (0.07 mol, 3 mol percent based on monomer) of carbon dioxide was added in vacuo via the gas inlet tube. The system was brought to atmospheric pressure by the addition of dry nitrogen. The solution was poured into polymerization bottles and placed in a 50° C. oven for eight hours. The resulting hard polymer was placed in a 5° C. refrigerator overnight, then broken up and extracted with water to remove the alkali. After drying in a vacuum oven, a yield of 17.7 g of polymer/100 g of monomer was obtained.

EXAMPLE 2

A procedure similar to that in Example 1 was carried out on 200 g of purified 2-pyrrolidone with the following differences: 12.3 g (0.188 mol, 8 mol percent based on monomer) of 85.7% pure potassium hydroxide was used and 1.6 g (0.025 mol, 1.06 mol percent based on monomer) of dry sulfur dioxide was added at atmospheric pressure. No carbon dioxide was added. After eight hours at 50° C. and overnight refrigeration, a yield of 35.9 g of polymer/100 g of monomer was obtained.

EXAMPLE 3

A procedure similar to that of Example 1 was carried out on 200 g of purified 2-pyrrolidone with the following differences: 1.76 g (0.0470 mol, 2 mol percent based on monomer) of carbon dioxide was added as described, and then 1.54 g (0.0235 mol, 1 mol percent based on monomer) of sulfur dioxide was added at atmospheric pressure. After eight hours at 50° C. and overnight refrigeration, a yield of 55.2 g of polymer/100 g of monomer was obtained.

EXAMPLE 4

A procedure similar to that of Example 3 was carried out on 200 g of purified 2-pyrrolidone with the following differences: 17.1 g (0.26 mol, 11 mol percent based on monomer) of 85.7% pure potassium hydroxide was used, and 3.1 g (0.07 mol, 3 mol percent based on monomer) of carbon dioxide and 1.49 g (0.023 mol, 1 mol percent based on monomer) of sulfur dioxide were added. After eight hours at 50° C. and overnight refrigeration, a yield of 60.8 g of polymer/100 g of monomer was obtained.

EVALUATION

The results obtained in the polymerizations of Examples 1–4 are summarized in the following table. In Examples 1 and 3 the total alkaline polymerization catalyst was 10 mol percent, based on total monomer, and the combined amount of activator was 3 mol percent, based on total monomer, in each example. In Example 2 the total catalyst was 8 mol percent and the activator was 1 mol percent. In Example 4 the total catalyst was 11 mol percent and the activator was 4 combined-mol-percent. These mol percentages were chosen to provide a constant 7 mol percent of potassium pyrrolidonate catalyst uncombined with $SO_2$ or $CO_2$ in each example.

TABLE

| Example | Activator | Yield* | Relative Yield |
|---|---|---|---|
| 1 | 3 mol % $CO_2$ | 17.7 g | 1 |
| 2 | 1 mol % $SO_2$ | 35.9 g | 2.0 |
| 3 | 2 mol % $CO_2$ | | |
| | 1 mol % $SO_2$ | 55.2 g | 3.1 |
| 4 | 3 mol % $CO_2$ | | |
| | 1 mol % $SO_2$ | 60.8 g | 3.4 |

*Yield in grams of poly-2-pyrrolidone per 100 grams of 2-pyrrolidone, after 8 hours at 50° C.

Example 1 shows that polymerization under the stated conditions of 7 mol percent uncombined potassium pyrrolidonate and 3 mol percent carbon dioxide based on total 2-pyrrolidone at 50° C. for 8 hours yields less than 18 grams of polymer per 100 grams of monomer (even after 20 hours the yield was less than 50 grams/100 grams monomer).

Using the same concentration of uncombined potassium pyrrolidonate as in Example 1, but with 1 mol percent sulfur dioxide as the activator (Example 2) the yield per 100 grams of monomer was doubled at 8 hours. Therefore, the relative yield for Example 2 is 2.0 (last column).

Using the same total catalyst concentration as in Example 1, but taking 1 mol percent sulfur dioxide and 2 mol percent carbon dioxide (less $CO_2$ than in Example 1) to make up 3 combined mol percent of the activator of the present invention, the yield under the same conditions increased to 55.2 grams/100 grams monomer (Example 3). This corresponds to a relative yield of 3.1 for the $SO_2/CO_2$ activator, which is a totally unexpected improvement over the yield obtainable from either sulfur dioxide or carbon dioxide alone at these concentrations.

Example 4 shows the improvement in yield obtainable from 4 mol percent of combined $SO_2/CO_2$ activator (3 mol percent $CO_2$, 1 mol percent $SO_2$) over the simple addition of yields from the independent use of $CO_2$ and $SO_2$ (Example 1, 3 mol percent $CO_2$ and Example 2, 1 mol percent $SO_2$).

Viewed in another way, since 3 mol percent carbon dioxide yields 17.7 grams/100 grams under certain conditions, and 1 mol percent sulfur dioxide yields 35.9 grams/100 grams under the same conditions, then the combined yield of $SO_2/CO_2$ activator at 1 mol percent $SO_2$ and 3 mol percent $CO_2$ is predicted to be the combined independent yields of each, i.e., 17.7 grams per 100 grams + 35.9 grams per 100 grams = 53.6 grams/200 grams monomer, but the observed combined yield per 200 grams of monomer is actually 2×60.8 (Example 4) = 121.6 grams/200 grams monomer. Thus, the actually observed combined yield of $SO_2/CO_2$ activator is more than twice the combined independent yields of $SO_2$ and $CO_2$.

Furthermore, even after 24 hours, the yield of Example 1 did not reach that of Example 4 after only 8 hours, and even after 12 hours the yield of Example 2 did not reach that of Example 4 after only 8 hours. Consequently, from the time conversion point of view, these results show that the synergistic activator, $SO_2/CO_2$, is at least 150–300 percent more effective than either member of the combination alone.

What is claimed is:

1. A process for the polymerization of 2-pyrrolidone to produce a polymer capable of being formed into filaments suitable for making textiles, which process comprises contacting the 2-pyrrolidone under substantially anhydrous conditions with a catalyst system consisting essentially of an alkali metal pyrrolidone, carbon dioxide and sulfur dioxide and wherein the combined mol percent carbon dioxide plus sulfur dioxide is 0.02–30, based on 2-pyrrolidone, and the mol ratio of carbon dioxide to sulfur dioxide is in the range of about 1:0.3–0.5.

2. The process of claim 1 wherein said polymerization is conducted at temperatures in the range of about 25° to 70° C.

* * * * *